(12) United States Patent
Andress et al.

(10) Patent No.: US 6,578,370 B1
(45) Date of Patent: Jun. 17, 2003

(54) CONTINUOUS FLOW QUICK-CHILLING APPARATUS AND METHOD FOR MASS PRODUCTION OF PRECOOKED FOODS

(75) Inventors: Alfonso G. Andress, Malecon Balta 720, Lima 18 (PE); Alfonso M. Andress, Lima (PE)

(73) Assignee: Alfonso G. Andress, Lima (PE)

( * ) Notice: Subject to any disclaimer, the term of this patent is extended or adjusted under 35 U.S.C. 154(b) by 0 days.

(21) Appl. No.: 10/067,602

(22) Filed: Feb. 7, 2002

Related U.S. Application Data

(60) Provisional application No. 60/326,632, filed on Oct. 3, 2001.

(51) Int. Cl.[7] ............................................. F25D 17/02
(52) U.S. Cl. ............................................. 62/64; 62/376
(58) Field of Search ..................... 62/375, 64, 376, 62/380, 373

(56) References Cited

U.S. PATENT DOCUMENTS

| | | | | |
|---|---|---|---|---|
| 3,027,734 A | * | 4/1962 | Mills | 426/393 |
| 3,240,026 A | * | 3/1966 | Van Dolah et al. | 62/374 |
| 3,376,406 A | * | 4/1968 | Phelps | 198/540 |
| 4,719,760 A | * | 1/1988 | Takayuki | 62/375 |
| 5,168,712 A | * | 12/1992 | Coelho et al. | 62/373 |
| 5,222,367 A | * | 6/1993 | Yamada | 62/60 |
| 5,377,492 A | * | 1/1995 | Robertson et al. | 62/374 |
| 5,423,191 A | * | 6/1995 | Bennett | 62/201 |
| 6,116,043 A | * | 9/2000 | Clark et al. | 62/376 |
| 6,216,469 B1 | * | 4/2001 | Miller | 165/171 |
| 6,272,879 B1 | * | 8/2001 | Lopez-Ordaz | 62/318 |
| 6,301,905 B1 | * | 10/2001 | Gallus | 426/405 |

* cited by examiner

Primary Examiner—William C. Doerrler
(74) Attorney, Agent, or Firm—McIntyre Harbin & King

(57) ABSTRACT

A quick-chilling apparatus and method utilizes a continuous flow liquid reservoir located at a first region of a centralized kitchen facility. The reservoir includes insulated walls and a cooling liquid, such as water, that endlessly circulates about submersed evaporator coils. A heat transfer coolant evaporated in the evaporator coils is compressed at a second region of the facility separated from the first region to extract heat from the cooling liquid. A compressor maintains the temperature of the cooling liquid less than about +2° C. Pre-cooked food items, packed in nylon or plastic bags, are submersed at a region of the reservoir downstream of the submersed cooling tubes and removed when chilled to +5° C. or less. Preferably, the reservoir is inclined 3–5° to provide a debris trap at one end thereof. Additives, such as salt, may be mixed with the cooling liquid to improve its thermodynamic cooling capacity.

4 Claims, 4 Drawing Sheets

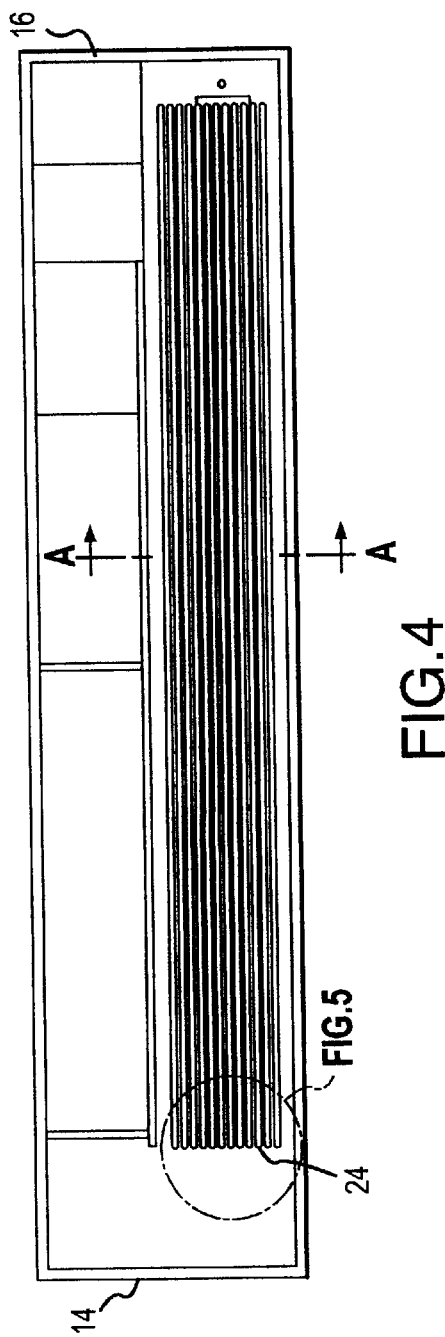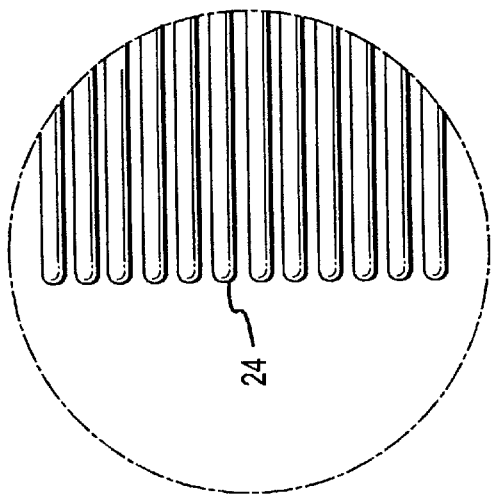

CONTINUOUS FLOW QUICK-CHILLING APPARATUS AND METHOD FOR MASS PRODUCTION OF PRECOOKED FOODS

This invention claims the benefit of Provisional Application No. 60/326,632 filed Oct. 3, 2001 in the names of the inventors hereof.

BACKGROUND

This invention relates to food processing, but more specifically to a method and an apparatus that chills large quantities of pre-cooked food items for storage and/or subsequent consumption.

Challenges in large-scale food production include identifying cooking techniques, preservation, spoilage, taste, quality control, pasteurization, storage, shipment, as well as the control and/or elimination of bacteria, viruses, and/or other microbiological agents. In order to quickly and conveniently serve large quantities of hot meals to a multitude of persons, it is often desirous to pre-cook foodstuffs; chill, pasteurize, and preserve the foodstuffs; and then heat and serve before consumption. Quick-chilling techniques, as they are terms, help provide a "just cook" taste when cooked food is rapidly chilled from cooking temperature down to about near freezing levels.

Cryovac Sealed Air Corporation is one company that manufactures quick-chilling equipment as well as a Cook-Chill System where kettle-cooked foods are cooled in the same kettle. In blast chilling, cooked food items are packaged in nylon or plastic bags, and then blasted with chilled water and ice while circulating or tumbling in a chamber. Quick-chilling helps with pasteurization and bacteria control since cooked food items only momentarily reside at a temperature for bacterial growth. Ideally, cooked food is brought from a cooking temperature of about 100° C. or more down to near zero degrees Celsius, but not frozen, as quickly as reasonably possible to avoid bacterial growth, which begins to occur above 4–5° Celsius. Below that temperature, bacteria growth is nearly or completely arrested. Bacteria growth becomes critical, and begins to grow within seconds, between 5° C. and 70° C., but most bacterial agents are destroyed above 70° C. Thus, it is important to chill cooked foods as quickly as possible. In large scale or mass food production, quick chilling requires relatively high amounts of energy. Thus, most prior systems had limited chilling capacity.

It is also desirous to cook foodstuffs (i.e., meats, vegetables, fish, foul, etc.) under pressure in order to provide higher cooking temperatures that which reduces cooking time and the escape of nutrients, vitamins, proteins, color, texture, etc. It is also desirous to avoid preservative or other additives and to vacuum pack prepared foods. Many prior methods and apparatuses, however, do not adequately employ these techniques.

Pasteurization is also important. This involves controlling food temperature initially from about 37° C. to 100° C., and then back down to about 3° C. Considering that one BTU of energy is required to change the temperature of one pound of water by one degree, one million BTUs are required to chill 10,000 pounds of cooked food items by 100 degrees, assuming the food items contain mostly liquid or water (e.g., soups, stews, etc.).

As apparent, difficulties can become insurmountable in an effort to prepare and serve meals for 10,000 to 100,000 thousand people, or more. Preparing meals on-site near the time of consumption for this amount of people demand substantial on-site kitchens, facilities, dietary technicians, chefs and experienced food handlers.

The present invention addresses many of these problems.

SUMMARY

In accordance with one embodiment, the invention comprises a method of quick-chilling foodstuff in a centralized kitchen facility having compartmentalized regions. The method comprises providing a water-filled reservoir, circulating water in the chamber, submersing coolant tubes in the water-filled reservoir, submersing packaged pre-cooked foodstuff in the reservoir, maintaining the water temperature less than 5° Celsius by evaporating a coolant in the submersed coolant tubes and compressing the coolant at a location to vent heat to the external atmosphere, and removing the foodstuff when the temperature thereof reaches 5° Celsius or less.

In accordance with another embodiment, a quick-chilling apparatus for chilling large quantities of foodstuff in a centralized kitchen facility, the apparatus comprising an endless flow coolant tank filled with water, a circulatory pump to circulate water in the tank, a series of evaporator coils submersed in the water, and a controller that controls a compressor to maintain the water temperature less than 5° Celsius, where the compressor is located external of the region that houses the tank.

The above and other features of the invention will become apparent upon review of the following description taken with the accompanying drawings. The invention, though, is pointed out by the appended claims.

BRIEF DESCRIPTION OF THE DRAWINGS

FIG. 4 is a top view of the chilling apparatus of FIG. 1.

FIG. 5 shows a top view of cooling tubes submersed in the chilling apparatus of FIG. 1.

DESCRIPTION OF ILLUSTRATIVE EMBODIMENTS

Figure 1:
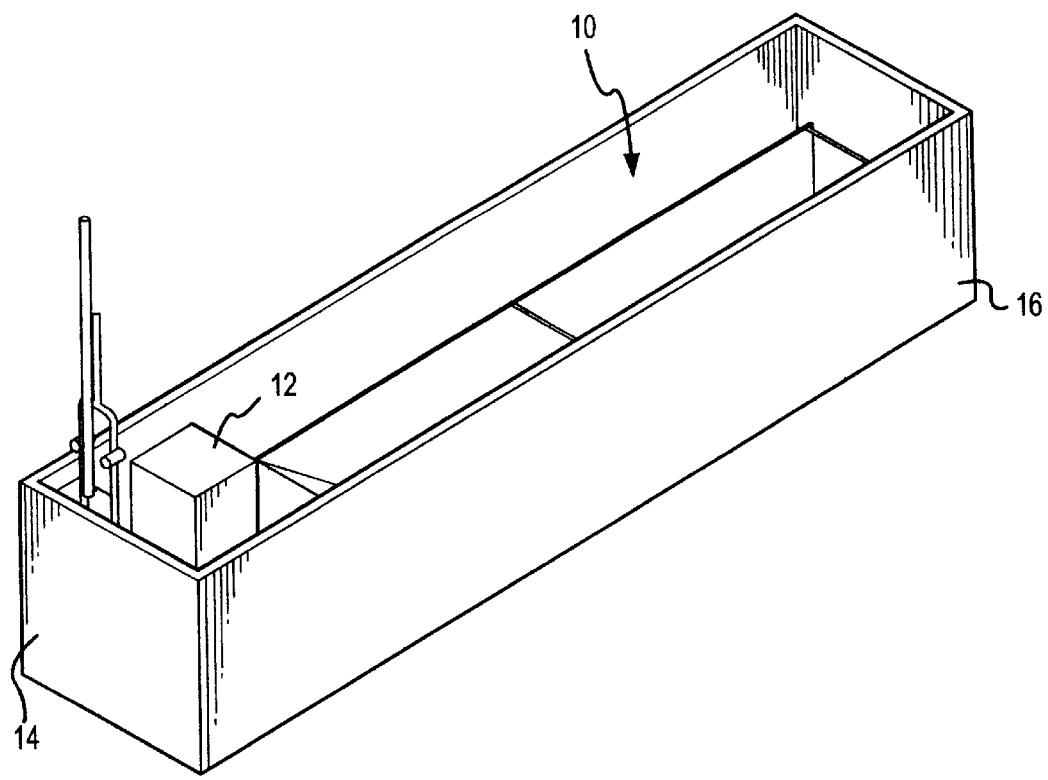
FIG. 1 is a perspective view of a preferred chilling apparatus according to an aspect of the present invention.

FIG. 1 shows an embodiment of a continuous flow chilling apparatus in accordance with an aspect of the invention. Reservoir or chamber 10 is filled with a cooling liquid, such as water. The water may include a non-toxic additive to lower its freezing temperature and increase its enthalpy, i.e., cold retention capacity. Ethylene glycol or other alcohols may also be used. Salt, which imposes a lower contaminate risk, may also be used to lower the freezing temperature of water. These additives help chill foodstuff more quickly. Chilled water is circulated in reservoir 10 by force of impeller driven action by motor assembly 12, which is cooled by a series of submersed cooling tube, preferable copper, through which a pressurized coolant, such as Freeon or other heat-exchanging fluid, is evaporated. The region or compartment of the facility that houses the chilling apparatus is also maintained at an aseptic temperature to inhibit bacteria growth, preferably at or near zero degrees Celsius, more or less. The coolant is compressed by a compressor and condenser assembly preferably located external to a room that hosts the chilling apparatus. Ideally, the water temperature should be maintained at a temperature of about +2° C., although this may be brought down to about zero degrees Celsius.

In a practical embodiment, external dimensions of the chilling apparatus measure 4990 cm×1115 cm×1050 cm. Insulated walls thereof have a thickness of about 10 cm and are packed with an insulating material. Using a 20 hp compressor to condense refrigerant, this embodiment had food-chilling capacity of 350 kg/hour.

Circulatory flow in reservoir 10 is preferably just below a turbulent state without bubble formation in the water in order to provide good heat transfer with submersed foodstuffs, which is about one to three meters per second, more or less.

In addition, the chilling apparatus may inclined about three to five degrees from end 14 to end 16 to induce gravity flow of the cooling liquid in reservoir 10. This also helps with debris clean-out since foreign matter injected in the water will collect at end 16.

Figure 2:
FIG. 2 is a side view of the chilling apparatus of FIG. 1.
Figure 3:
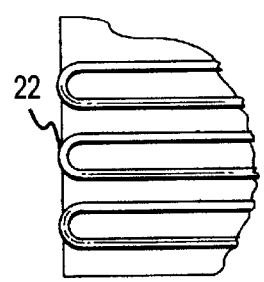
FIG. 3 is a detail of serpentine tubes submersed in a chamber of the chilling apparatus of FIG. 1.
Figure 6:
FIG. 6 is a top view of the chilling apparatus of FIG. 1.

FIG. 2 shows a series of egress and ingress tubes 18 and 20 that convey coolant within serpentine cooling tuber 22 that are shown in FIG. 3. In the implementation mentioned above, ingress tube 20 has a diameter of about ⅞" while egress tube 18 has a diameter of about 1⅜". The ingress tube extends from a conventional compressor (not shown) preferably located at a region separate from the region housing the chilling tank. The egress tube is also fed to the compressor, which compresses the gas expanded in the expansion, egress tube 18.

FIG. 4 is a top view of the chilling apparatus and shows a preferred arrangement of the serpentine cooing tubes 24. FIG. 5 is an expanded top view of the cooling tubes 24.

Figure 7:
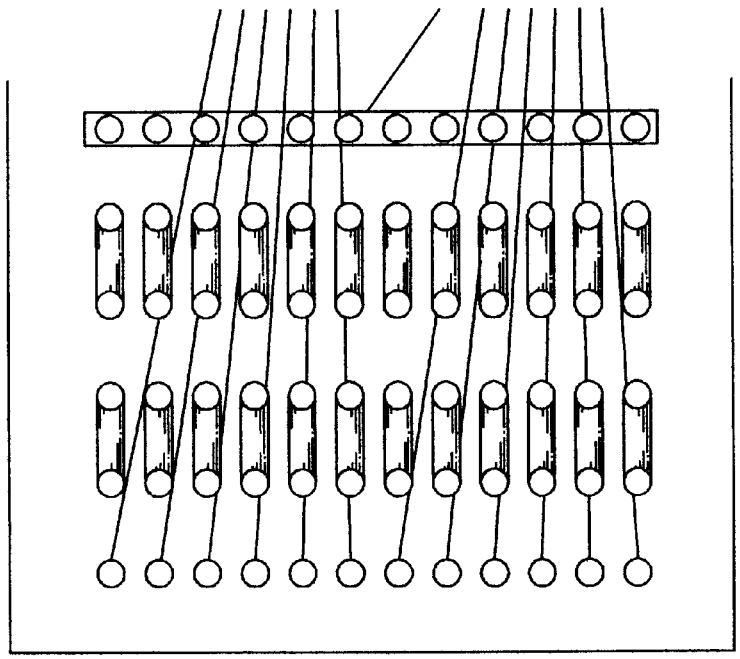
FIG. 7 is a cross-cut along lines A—A of FIG. 4.

FIG. 7 is a cross-cut along line A—A of FIG. 4 and better illustrates an end-to-end view of the serpentine tube structure of tube 24.

Figure 8:
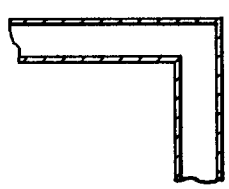
FIG. 8 is partial cross-sectional view of the wall structure of the chilling apparatus of FIG. 1.
Figure 9:
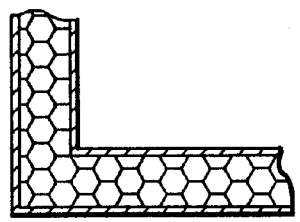
FIG. 9 shows insulating material or an insulating structure of the wall illustrated in FIG. 8.

FIG. 8 shows the wall structure of the chilling apparatus, and FIG. 9 shows insulating material in the wall structure.

An illustrative method in accordance with the invention comprises the steps of circulating a liquid such as water within a chamber or reservoir, cooling the liquid using a series of submersible evaporator tubes, submersing foodstuff to be chilled in the circulating liquid, maintaining the temperature of the liquid between zero and five degreed Celsius (+2° Celsius being preferred), and removing the foodstuff when cooled to a point at or above freezing. The method may further include adding antifreeze to the liquid, such as salt, ethylene glycol, or alcohol. The method may further include providing a serpentine copper tubing as the evaporator tubes and/or locating a compressor to compress the coolant external to the room that hosts the liquid.

Based on the teachings herein, other embodiments will fall within the scope of the appended claims.

We claim:

1. A method of quick-chilling food items in a centralized food processing facility, said method comprising:

providing a liquid reservoir at a first region of the facility, said reservoir including a first end having a higher elevation than a second end that is longitudinally displaced from said first end whereby to form a debris trap at a lower elevation near said second end, establishing a longitudinal flow of liquid from said first to said second end of the reservoir, submersing coolant tubes in the liquid at one region of the reservoir that extend longitudinally between said first and second ends, packaging said food items in flexible plastic or nylon bags, submersing packaged food items in a relatively stationary position within the reservoir, cooling the liquid in the reservoir to a temperature of 5° Celsius or less by evaporating a coolant in the submersed coolant tubes and compressing the coolant at a second region separate from the first region hosting the reservoir, and removing the food items when the temperature thereof reaches 5° Celsius or less.

2. An endless flow quick-chilling apparatus for chilling large quantities of foodstuff in a centralized food production facility having compartmentalized regions, said apparatus comprising:

a longitudinally extending reservoir to be filled with a liquid coolant that is located at a first region of the facility, a circulatory pump to circulate liquid coolant in the reservoir from a first end to a second end having a lower elevation than said first end, a longitudinally extending evaporator coil submersed at a first region of the reservoir between said first and second ends of said reservoir when filled with liquid coolant, a supporting structure in a second region of the reservoir for supporting food items to be chilled in flexible bags at a relatively stationary position relative to said reservoir where said second region enables flow of liquid coolant about said food items when supported in the reservoir, and a controller that controls a compressor in communication with the evaporator coil and a condenser to maintain the temperature of the liquid less than 5° Celsius, said compressor and condenser being located at a second region that is separated from the first region of the facility.

3. The apparatus recited in claim 2, where the reservoir is inclined 3 to 5° from one end to the other in order to establish the lower elevation of said second end.

4. The apparatus recited in claim 3, where the coolant liquid includes an additive to reduce freezing temperature thereof.

* * * * *